UNITED STATES PATENT OFFICE.

HENRY C. HILKE, OF SEATTLE, WASHINGTON.

ELEVATOR.

1,053,391.  Specification of Letters Patent.  Patented Feb. 18, 1913.

Application filed March 23, 1912. Serial No. 686,383.  REISSUED

*To all whom it may concern:*

Be it known that I, HENRY C. HILKE, a citizen of the United States, residing at Seattle, in the county of King and State of Washington, have invented certain new and useful Improvements in Elevators, of which the following is a specification.

This invention relates to improvements in elevators and is especially designed for use in hoisting lumber to be piled in stacks, although it may advantageously be employed for loading upon railway cars or boats other articles such as long pieces of structural iron.

The invention consists in the novel construction and combination of parts as will be hereinafter described and claimed.

Figure 1:
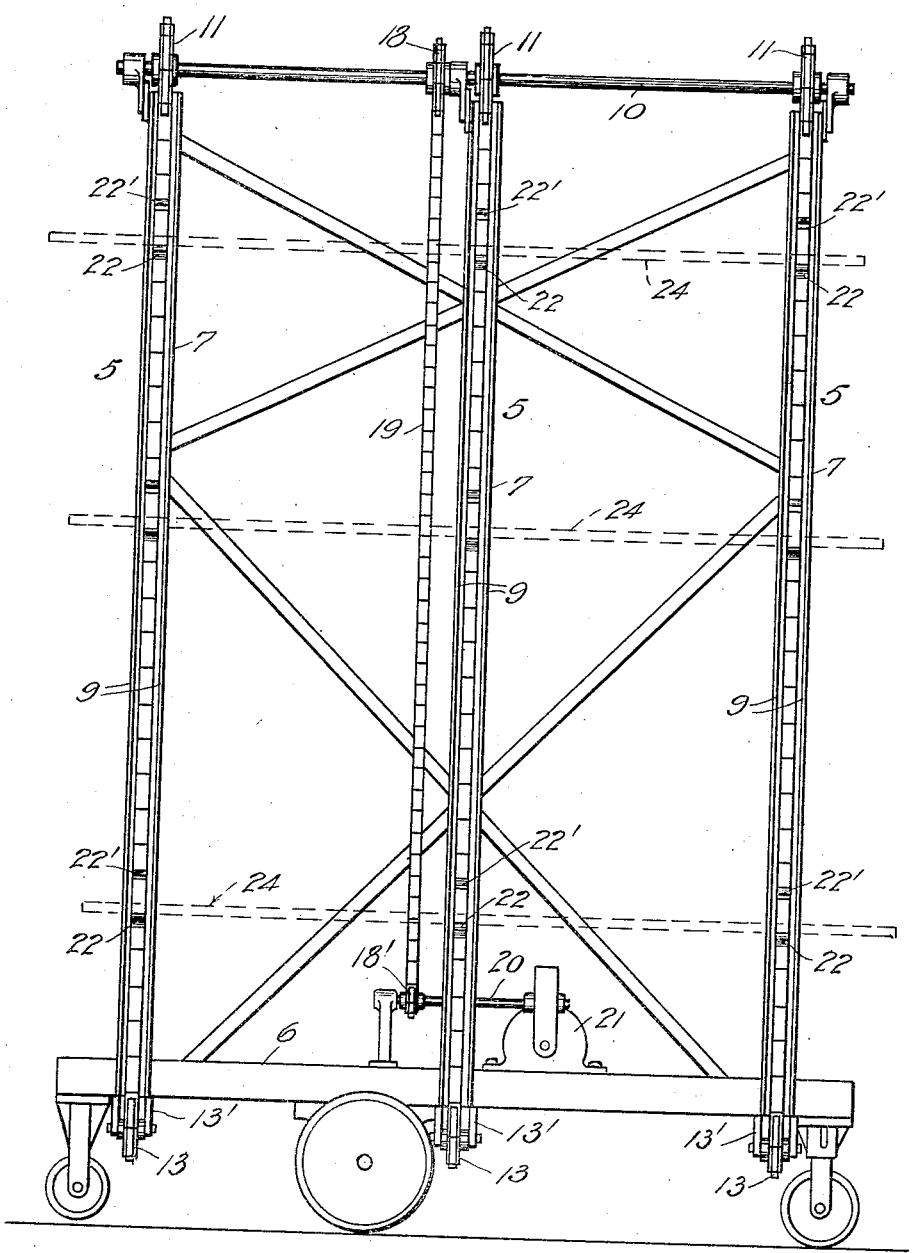
Figure 2:
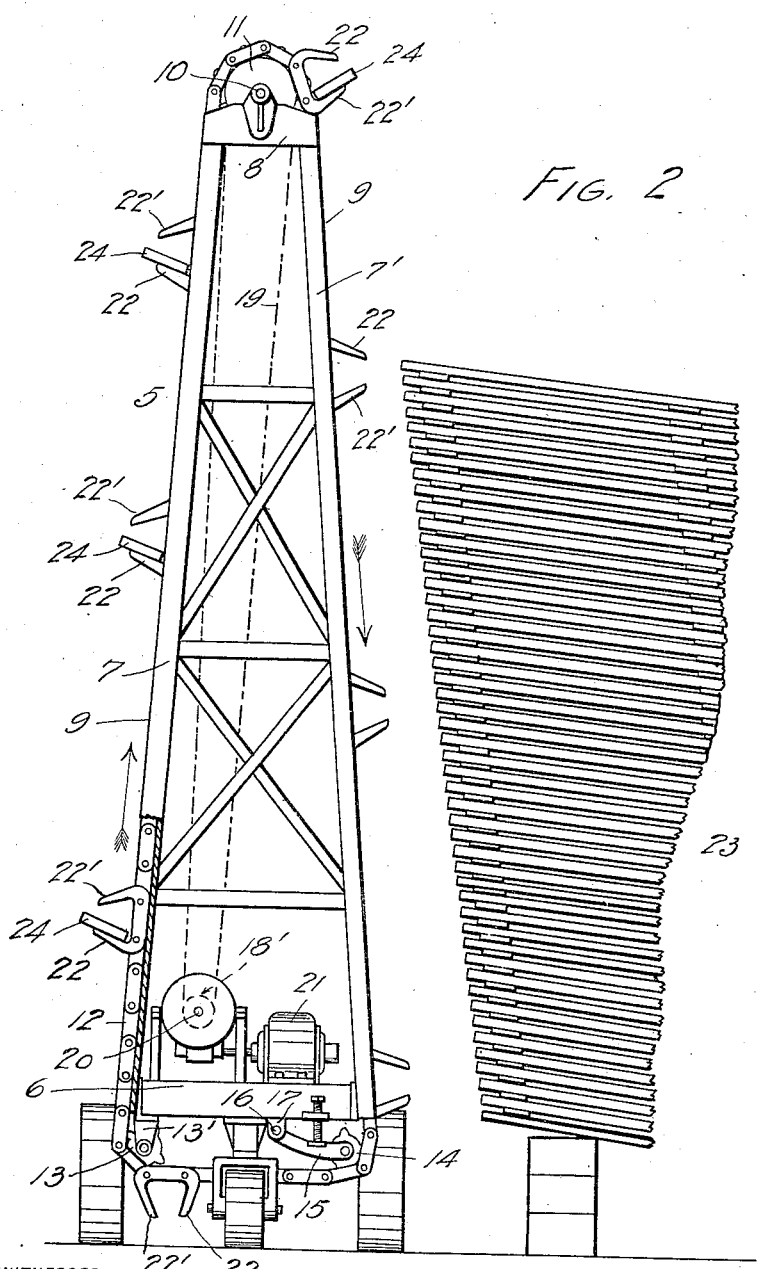

In the accompanying drawings, Figure 1 is a front elevation of a lumber elevator embodying my invention. Fig. 2 is an end elevation of the same.

The reference numerals 5 designate transversely arranged A-shaped members of the elevator frame work and which, as illustrated, are supported in spaced relations upon the platform 6 of a wheeled truck or car. Said frame members are each comprised of two posts 7 and 7' secured at their lower ends to the car platform and inclined inwardly toward their upper ends which are rigidly connected by a coupling plate 8 provided for each of said frame members. The posts 7 and 7' are formed of channel bars disposed to have the flanges 9 thereof directed outwardly.

Secured to the plates 8 are journal boxes for a longitudinal shaft 10 upon which are mounted sprocket wheels 11 for endless chains 12. These chains travel within the runways afforded between the flanges 9 of the respective frame posts. As illustrated in Fig. 2, said chains pass underneath of the car platform 6 and about guide wheels 13 and 14. The guide wheels 13 are mounted upon axles having their bearings in boxes 13' which depend from said platform, while the other wheels, 14, have their axles journaled in bearings provided in the free ends of arms 15 which are hingedly connected by pivotal pins 16 to hangers 17 secured to said platform.

18 represents a sprocket wheel mounted upon the shaft 10 to receive a chain belt 19 which is driven by a sprocket wheel 18' provided upon a counter-shaft 20 which, in turn, is driven by a power motor 21. Provided on said chains and arranged in the same relative positions thereon is a number of bracket attachments, or carriers, as they will hereinafter be designated. Each of these carriers is provided with two spaced arms 22 and 22', and which are disposed to converge toward their outer ends and provide a dove-tail recess therebetween.

In operation, the elevator is positioned in front of a stack of lumber, as 23, Fig. 2, and the motor is actuated to drive the conveyers, which are constituted of the respective chains and the carriers thereof, in the direction indicated by arrows in the view. Pieces of lumber, as 24, for example, are placed upon the lower arms 22 of the horizontally alined carriers of the various chains as the same rise to a convenient height to be loaded by the attendants standing upon the ground. As a carrier progressively ascends a load is supported conjointly by the sloping arms 22 of the carriers and the flanges 9 of the adjacent posts 7, until the carriers travel above the top of these posts. The referred to load is then transferred by the chains over the wheels and thence lowered at the other side of the elevator whereupon the load bears against the flanges of the posts 7'. In passing over the sprocket wheels 11, each load is canted or shifted from the carrier-arms 22 to the other carrier-arms 22' and thus remains until the loaded carriers descend to an appropriate height for the attendants upon the stack to remove the stick or piece of lumber. By having the load supporting arms of the carriers inclined downwardly toward the frame when operative, the tendency of the load is to keep close to the frame, thus obviating any liability of the load falling from the carriers even when the conveyers are driven at a relatively high speed.

By reason of the loads being deposited upon the elevator at one side and removed from the other side of the same, it is apparent that the elevator may be operated close to a lumber pile and afford ample room for the attendants to conveniently handle the material.

While I have described the invention as applied to the elevating of lumber, it may obviously be used in lowering lumber therefrom, either by reversing the direction of motion of the conveyer chains or by turning the apparatus around.

What I claim is—

An elevator of the class described, comprising a wheeled truck, a frame rigidly secured thereto and constituted of a plurality of A-shaped frame members severally composed of inclined channel-bars rigidly connected together at their upper ends, chain conveyers operating in the bar channels of the respective frame members, said conveyers including carrier attachments which are each provided with two spaced arms, a shaft supported by said frames at the upper ends of the latter, sprockets carried by said shaft over which said chains travel, a drive sprocket on the shaft, a power motor on the truck, and drive connections between the power motor and the drive sprocket on the shaft.

Signed at Seattle, Wash., this 19th day of March, 1912.

HENRY C. HILKE.

Witnesses:
PIERRE BARNES.
E. PETERSON.